United States Patent [19]

Krambeck

[11] Patent Number: 5,775,618
[45] Date of Patent: Jul. 7, 1998

[54] TENSION CONTROLLED SEAT BELT RETRACTOR

[75] Inventor: Dagoberto Krambeck, Troy, Mich.

[73] Assignee: AlliedSignal Inc., Morristown, N.J.

[21] Appl. No.: 656,625

[22] Filed: May 31, 1996

[51] Int. Cl.[6] .................................................. B60R 22/44
[52] U.S. Cl. ............................................................ 242/372
[58] Field of Search .......................... 242/372; 280/806, 280/807; 297/478, 480, 475, 476, 477

[56] References Cited

U.S. PATENT DOCUMENTS

| 4,113,062 | 9/1978 | Beland | 242/372 |
| 4,228,968 | 10/1980 | Jahn | 242/372 |

Primary Examiner—John M. Jillions
Attorney, Agent, or Firm—Markell Seitzman

[57] ABSTRACT

A seat belt retractor (20) comprising: a spool (25) and a frame (52) for rotationally supporting the spool; a seat belt (16) receivable on the spool, a rewind spring (80) for biasing the spool in a belt winding direction comprising a spring (80) having an inner spring end (82) connected to and rotated by a shaft (56) movable with the spool and a fixedly secured outer spring end (84); an auxiliary spring (120) and gear set (100, 102) (70, 72, 80, 81) operatively connected to the inner spring end in continuous driving connection with the shaft for generating a torque to reduce the level of force imparted to the shoulder of a seat belt user and to increase the rewind force when the rewind spring is rewinding the seat belt.

6 Claims, 2 Drawing Sheets

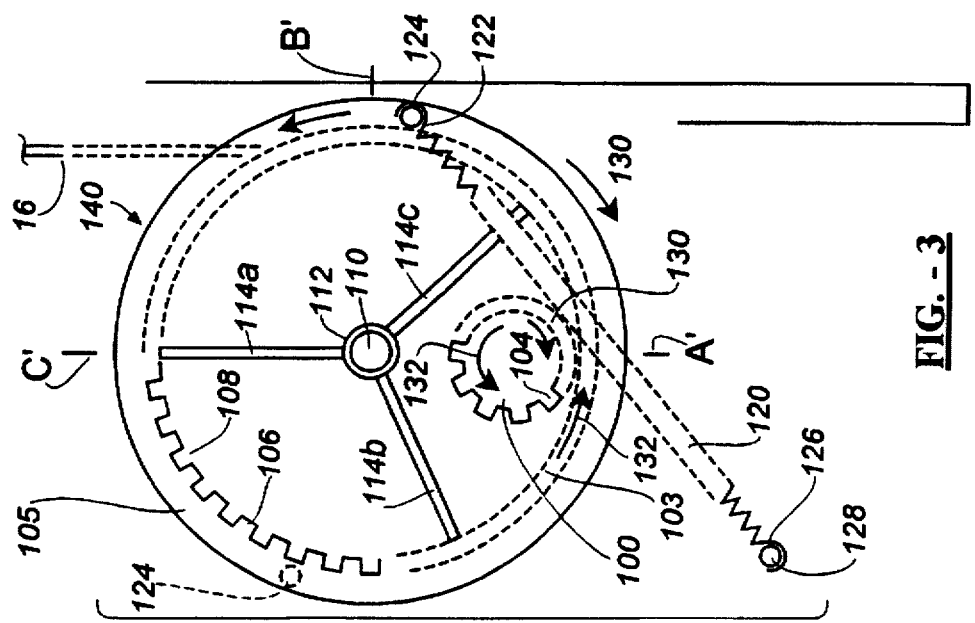
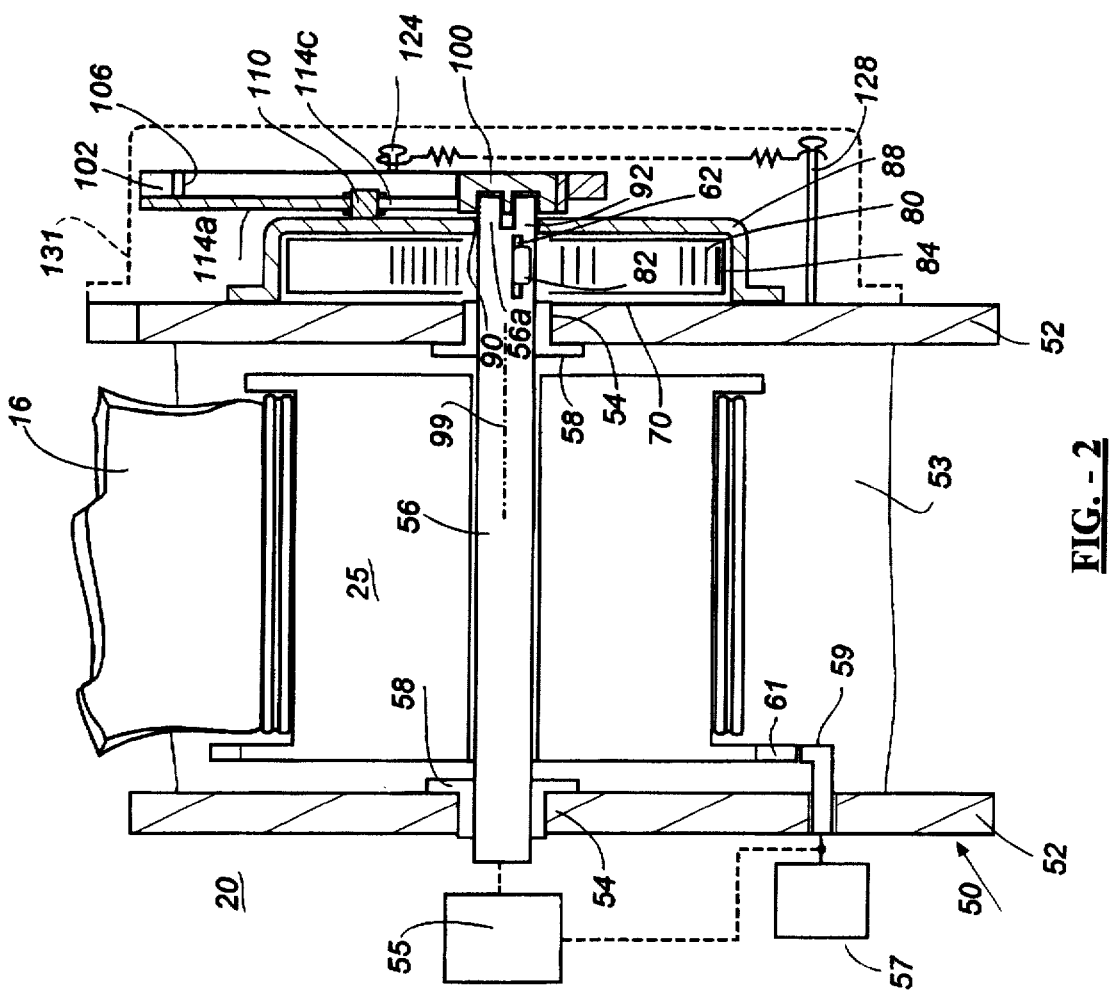

TENSION CONTROLLED SEAT BELT RETRACTOR

BACKGROUND AND SUMMARY OF THE INVENTION

The invention is generally related to safety restraint systems and, in particular, to a tension reducing mechanism for a seat belt retractor.

Seat belt retractors used in current safety restraint systems rewind the seat belt tightly against the shoulder of the occupant of the seat. In many applications, the rewind force of the spring creates an objectionable force level or tension against the occupant's shoulder or neck which is a source of discomfort. The obvious solution to this problem is to use a weaker rewind spring, however, such a spring cannot fully rewind the seat belt from its protracted length.

To reduce this excess force or tension, some seat belt retractors used a manually adjustable tension remover in which a portion of the seat belt could be unwound from the retractor spool and the retractor spool would automatically be prohibited from rewinding the manually extended slack. The prior art has proposed many other solutions to reduce the spring force while maintaining sufficient force to rewind the webbing.

The concept of tension reduction has also been addressed using a more complicated electrical system. Frantom et al., in U.S. Pat. No. 4,655,312, teaches an electrically adjustable safety restraint system in which an electric motor is energized in response to the buckling of the adjustable tongue into buckle of the safety restraint system to wind the seat belt on the retractor's spool until a predetermined tension is detected. After the predetermined tension is sensed, the electric motor is reversed for a period of time selected to produce a predetermined slack in the shoulder portion of the seat belt.

In a conventional seat belt retractor the inner end of the rewind spring is connected to the retractor shaft, spring arbor or spool and the outer end is connected to a stationary member such as the retractor frame or rewind spring housing. As the belt is protracted the spring is wound tightly about the shaft and the rewind force level increases (see FIG. 4, curve 150). In the present invention an opposing force or torque is applied to the retractor shaft by an auxiliary spring and gear set combination. In certain positions of the gear set the auxiliary spring decreases the resultant force applied to the occupant's shoulder while in other positions the auxiliary spring increases the resultant rewind force assisting the retractor's rewind spring to retract the webbing onto the spool. The present invention provides a simple mechanical solution to control the force level or tension applied to the occupant by the shoulder belt portion of the seat belt.

It is an object of the invention to simply and automatically control the tension (also referred to as force) imparted by the shoulder belt to an occupant's shoulder.

Accordingly, the invention comprises: a seat belt retractor having a spool and frame for rotationally supporting the spool. A seat belt (webbing) is received on the spool and a rewind spring is provided to bias the spool in a belt winding direction. The rewind spring has its inner end attached to a retractor shaft (or spool) and its outer end attached to a spring cup or to the retractor frame in a conventional manner. An auxiliary spring produces an opposing torque applied to the shaft through a gear set to reduce the rewind torque and hence the force or tension applied to the occupant's shoulder.

Many other objects and purposes of the invention will be clear from the following detailed description of the drawings.

BRIEF DESCRIPTION OF THE DRAWINGS

In the drawings:

FIG. 2 is a cross-sectional view of a retractor incorporating the present invention.

FIG. 3 is a side plan view of the retractor.

DETAILED DESCRIPTION OF THE DRAWINGS

Figure 1:
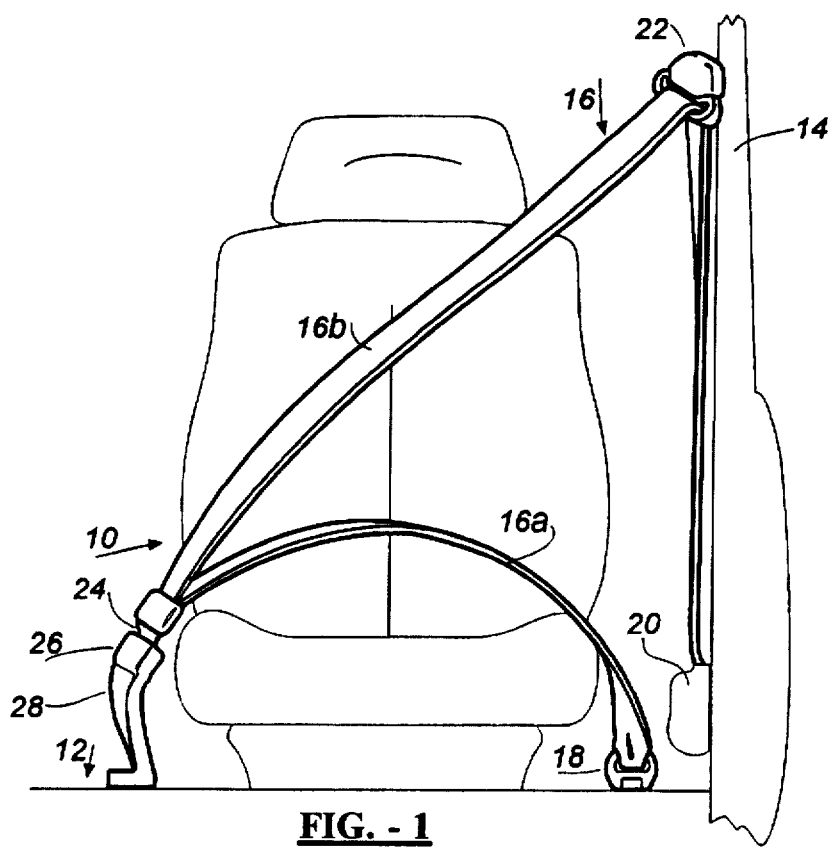
FIG. 1 is a schematic drawing of a safety restraint system.

While the present invention is described with reference to a continuous loop three-point safety restraint system having a single seat belt retractor, the concept is equally applicable to three-point systems having dual retractors or a two-point lap/shoulder belt system having a single retractor. The invention can be used in any seating position within the vehicle. It is not intended that the invention be limited to the specific embodiment illustrated in the drawings and described herein.

With reference to FIG. 1, there is shown the basic components of a continuous three-point safety restraint system used in conjunction with a front driver seat 10 of an automotive vehicle. The seat 10 is attached to the floor 12 of the vehicle in a conventional manner. The seat 10 may have a fixed relationship to the floor 12 or may be adjustable as is known in the art.

Adjacent to the seat 10 is a side pillar (B-pillar) 14. A seat belt 16 (web or webbing) is connected at one end to an anchor bracket 18 attached to the floor 12 on one side of the seat 10 or directly to the frame of the seat as is known in the art. The opposite end of the seat belt 16 is connected to a spring-loaded retractor 20, conventionally attached to the pillar 14 as shown.

Alternatively, the retractor 20 may be attached to the floor 12, the back of the seat 10 or any other structural member of the vehicle.

The seat belt 16, as shown, is supported by a web guide (D-ring) 22 attached to the pillar 14 at an elevated location above the location of the shoulder of a seated occupant in a conventional manner. The portion of the seat belt 16 between the web guide 22 and the anchor bracket 18 is divided into a lap belt portion 16a and a shoulder belt portion 16b by an adjustable or slip tongue 24 of known construction.

The tongue 24 is receivable in a buckle 26, as shown, attached to the floor 12 by a buckle support 28 or any other structural member of the vehicle on the side of the seat 12 opposite the anchor bracket 18.

Reference is made to FIGS. 2 and 3 which illustrate the details of a preferred embodiment of the present invention. Illustrated is a retractor 20 having a frame 50 with sides 52 and back 53 which rotationally supports a spool 25 about which the seat belt 16 is wound. The retractor typically includes a toothed wheel 61 rotatable with the shaft 56, which is engaged by a locking member such as a rotary lock dog or pawl 59. The locking member is moved into locking engagement with the toothed wheel under control of a vehicle sensor 57 which is activated when vehicle deceleration exceeds a low limit value such as between 0.45–0.7 g or by a web sensor 55 when the rate of webbing protraction exceeds a low limit value such as 1.5 g. Typically the various sensors are located against one side of the retractor frame. A rewind spring 100 is located against the other side of the retractor frame. The web sensor 55 and vehicle sensor 57 are diagrammatically shown, in FIG. 3, interacting with a locking pawl 59 to lockingly engage the toothed wheel 61. Each frame side 52 includes an opening 54. The retractor shaft 56 extends through the openings 54 and is supported by bushings 58. The section 60 of the shaft 56 includes a slot which functions as a spring arbor 62. A rewind spring 80 having an inner end 82 is connected to the shaft via the slot 62. The outer spring end 84 is fixedly attached to the retractor frame or to a spring housing 88 which protects the rewind spring. The spring housing 88 is secured by known means to the frame. The rewind spring 80 is preloaded during assembly to produce a torque sufficient to completely rewind the seat belt when the tongue 24 is unlatched from the buckle 26. This condition is normally referred to as the stored condition of the seat belt.

The shaft 56 includes an extension 56a extending through an opening 90 within the spring housing 88. This extension 56a includes a bore 92. A first gear 100, having teeth 104, is connected to and rotates with the shaft 56. As illustrated the first gear 100 is pressed into the bore 92 of the shaft extension 56a. Any other means of attachment can be used. Positioned in driving engagement with the first gear 100 is a second gear 102, having teeth 106. As will be seen below, the first and second gears are both a driven and a drive gear depending upon the operating phase of the present invention. The second gear 102 is eccentrically positioned relative to the axis 99 of shaft 56 and engagable with the teeth 104 of the first gear 100. In the illustrated embodiment the gear 102 has an annular body 105 with the teeth 106 formed on an inner surface 108 thereof. The second gear is supported upon a shaft 110 which may be appropriately located on the retractor. For the purpose of illustration the shaft is shown extending from the spring housing 88. The second gear 102 includes a hub 112 rotatably supported to shaft 110 and a plurality of spokes 114a,b,c which extend from the hub to the annular gear body 105.

As will be seen from the description below the direction of motion of the first gear (i.e. shaft 56) and the second gear are always in the same direction. This "same direction" driving relationship is achieved by the simple two-gear drive train (gear set) shown and can also be achieved by more elaborate (planetary or multi-gear) gear trains. Further, as can be appreciated, if desired the second gear can have external teeth in driving relationship with the teeth of the first gear 100, however, this design would necessitate using an idler gear intermediate the first and second gears.

Figure 4:
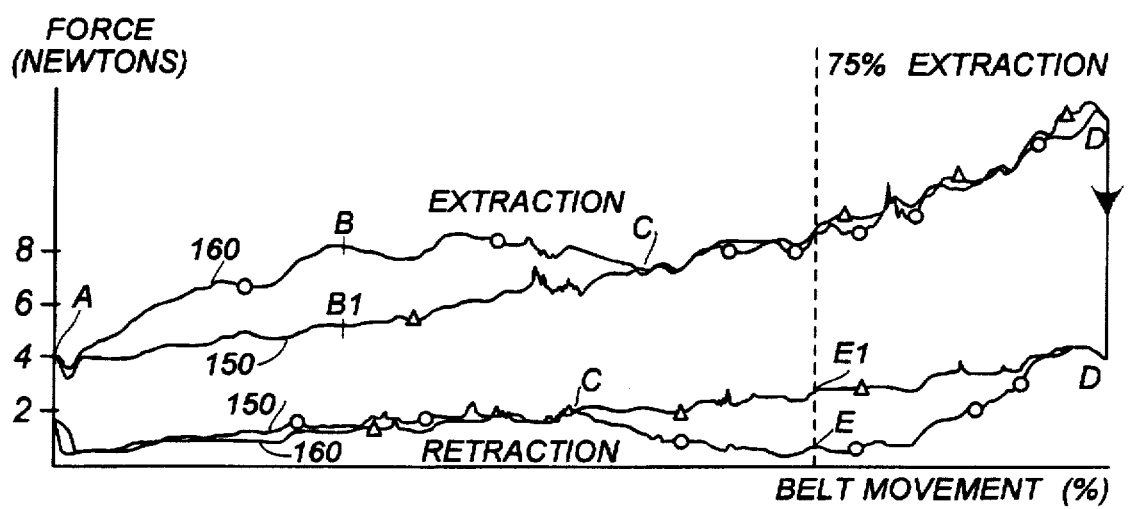
FIG. 4 diagrammatically shows the relationship between the spring rewind force for a conventional retractor and for a retractor embodying the present invention.

A bias spring 120 is attached to the second gear and to the retractor frame. The spring 120 and the gears 100 and 102 may be protected by a cover 131 shown in phantom line. As shown one end 122 of the bias spring 120 is attached to a pin 124 located on the second gear and its other end 126 is attached to another pin 128 secured to the frame. As can be seen from FIG. 3, in the illustrated position, the spring 120 is pulling the second in a clockwise (CW) direction (see the torque arrows labeled as 130). This clockwise torque is directly transmitted to the shaft 56 through the first gear. The clockwise (rewind or retraction) direction torque on the shaft will assist the rewind spring 80 in rewinding the belt 16 upon the spool 25. As can be appreciated with regard to the above torque transmittal, the second gear "drives" the first gear. The level and direction of the transmitted torque will vary with the position of the pins 128 and 124. The second gear 102 (see arrows 132 showing direction of rotation) is driven by the first gear 100 as the shaft/spool rotates as webbing 16 is protracted and retracted off from or onto the spool. As the gear 102 rotates the location of the pin 124 relates to the fixed pin 128 changes. When the second gear 102 and pin 124 are moved to the transition point C' (FIG. 3) which is generally a point over the center of the pin or shaft 110, the auxiliary spring 120 will begin to pull the second gear 102 in a counter-clockwise (CCW) direction. This CCW directed torque is directly applied to the shaft through the gear set 100,102 tending to drive the shaft in a CCW (belt unwinding) direction in opposition to the rewind force or torque produced by the rewind spring 80. This opposingly directed torque reduces the effective spring force acting upon the seat belt 16 and the force or tension acting on the occupant's shoulder. The above is more clearly illustrated with reference to FIG. 4 which shows extraction/retraction test data curves for a typical retractor (see curve 150) and for the same retractor using the tension reduction components (see curve 160) of the present invention.

With the belt 16 completely stowed on the spool the rewind spring 80 generates a torque of a value which is generally equal for both retractors (see point A on both curves 150 and 160). Point A generally corresponds to position A' of the second gear 102, a position in which the auxiliary spring 120 is not extended and/or does not provide any appreciable force to the second gear. As the belt 16 is extended from the spool the spring force (of spring 120) increases as the pin 124 moves (i.e. gear 100 drives gear 102) in a belt unwinding (CCW) direction. This spring force generally is in the same direction as the rewind force of the rewind spring 80 requiring the occupant to expend more energy to extract the belt compared to the retractor that does not include the tension reduction components of the present invention. At a position B' of gear 102 travel, maximum spring 120 torque is achieved and the extraction force (see curve 160) is generally also at a maximum value (see point B). Reference to made to the point B1 of curve 150 of the typical retractor which shows a lower level of extraction force for the same amount of web removed from the spool. As gear 102 continues to rotate the pin 124 will move to an over-center position C' in which the added torque contributed by the auxiliary spring 120 is zero. This is location C" which corresponds to point C (see FIG. 3) on both curves 150 and 160. As the pin 124 is moved to the left of the over-center position C' the spring 120 provides an added torque which opposes the rewind torque/force produced by the rewind spring 80. If the belt is extracted further the spring 120 reduces the extraction force. This can be seen as curve 160 is generally below curve 150 from point C to point D (full extraction). As is known in the art the extraction/retraction curves of seat belt retractors exhibit hysteresis and that is why the various points on the extraction curve are not identical to the same points on the retraction curve. This hysteresis is generally due to friction inherent to the retractor and the added weight of hardware, such as a seat belt latch plate (tongue) and the length of seat belt (webbing) that is lifted during retraction. As can be seen from the retraction portion of the extraction/retraction curves 150 and 160 the retractor having the tension reduction components of the present invention displays a significant drop of force level at the 75% belt extraction position, see point E of curve 160 and point E1 of curve 150. This 75% extraction position corresponds to the average amount of webbing protracted from the spool when the seat belt is secured about an averaged sized person. The actual range of auxiliary spring 120 force can be shifted along the extraction and retraction curves by changing the gear ratio between gears 100 and 102 and by varying the phasing of the force/torque generated by the spring 120 in relation to the length of the seat belt extracted from the spool. This opposing torque produced by the spring 120 reduces to zero as the belt is retracted onto the spool and as gear 100 drives gear 102 through the over-center position C' (FIG. 3). As the belt continues to be retracted on the spool the spring 120 provides a CCW force to assist the rewind spring. This auxiliary force can be seen as curve 160 is generally above curve 150 during the last phases of belt retraction.

Many changes and modifications in the above described embodiment of the invention can, of course, be carried out without departing from the scope thereof. Accordingly, that scope is intended to be limited only by the scope of the appended claims.

I claim:

1. A seat belt retractor comprising:

a spool and frame means for rotationally supporting the spool;

a seat belt receivable on the spool;

rewind spring means for biasing the spool in a belt winding direction;

a drive unit comprising only a first member and a second member, the first member rotatable with the spool and the second member in driving relationship with the first member, the first and second members always rotatable in the same direction, and an auxiliary spring having one end attached to the second member for generating an auxiliary driving torque which, in combination with the second member, selectively reduces the rewind spring force subsequent to the seat belt having been protracted a determinable amount and selectively increases the rewind spring force during seat belt retraction.

2. The device as defined in claim 1 wherein the auxiliary torque imparted to the spool by the auxiliary spring is at or near its maximum value when the seat belt is installed about a user.

3. The device as defined in claim 1 wherein the first and second members are part of a gear set.

4. The device as defined in claim 1 wherein the first and second members are gears.

5. The device as define in claim 1 wherein the auxiliary spring is movable between a non-extended length to an extended length in correspondence with to motion of the second member.

6. The device as defined in claim 1 wherein the first member is a spur gear having external teeth and the second member is a ring gear having internal teeth, the ring gear position eccentrically relative to the center of the spur gear.

* * * * *